(12) United States Patent
Iwasa et al.

(10) Patent No.: US 8,820,452 B2
(45) Date of Patent: Sep. 2, 2014

(54) VEHICLE COMPONENT MOUNTING ARRANGEMENT

(75) Inventors: Makoto Iwasa, Chigasaki (JP); Nobuhiro Mori, Odawara (JP); Satoshi Shigematsu, Yokohama (JP); Kenji Tamura, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 111 days.

(21) Appl. No.: 13/319,873

(22) PCT Filed: May 12, 2010

(86) PCT No.: PCT/IB2010/001098
§ 371 (c)(1),
(2), (4) Date: Nov. 10, 2011

(87) PCT Pub. No.: WO2010/133934
PCT Pub. Date: Nov. 25, 2010

(65) Prior Publication Data
US 2012/0055724 A1    Mar. 8, 2012

(30) Foreign Application Priority Data

May 22, 2009  (JP) .................. 2009-124249
Jul. 15, 2009  (JP) .................. 2009-166937
Jan. 13, 2010  (JP) .................. 2010-005092

(51) Int. Cl.
*B60L 11/18* (2006.01)
*B60K 1/04* (2006.01)
(52) U.S. Cl.
CPC .. *B60K 1/04* (2013.01); *B06L 11/18* (2013.01)
USPC ......... 180/68.2; 320/109; 320/110; 307/10.6; 701/22
(58) Field of Classification Search
None
See application file for complete search history.

(56) References Cited

U.S. PATENT DOCUMENTS

2005/0069773 A1* 3/2005 Nakai .................. 429/231.1
2009/0079389 A1* 3/2009 Ohtomo ................ 320/109

FOREIGN PATENT DOCUMENTS

| CN | 1604361 A | 4/2005 |
| JP | 06-303704 | 10/1994 |
| JP | 10-112902 | 4/1998 |
| JP | 2001-128304 | 5/2001 |
| JP | 2007-269249 | 10/2007 |
| JP | 2007-274849 | 10/2007 |

(Continued)

OTHER PUBLICATIONS

An English translation of the Decision on Grant for the corresponding Russian patent application No. 2011152354 issued on Dec. 12, 2012.

(Continued)

*Primary Examiner* — J. Allen Shriver, II
*Assistant Examiner* — Hilary L Johns
(74) *Attorney, Agent, or Firm* — Global IP Counselors, LLP (57) ABSTRACT

A vehicle component mounting structure is provided with a vehicle body, a battery, a charger, a high-power electrical component other than the charger. The battery is mounted on the vehicle body. The charger is mounted on the vehicle body and converts a lower-voltage electric power supplied thereto from an external source into a higher-voltage electric power that is supplied to the battery. The high-power electrical component is mounted on the vehicle body with high voltage being supplied to the high-power electrical component. The charger and the high-power electrical component are arranged on longitudinally opposite sides of the battery with respect to a longitudinal direction of the vehicle body.

17 Claims, 5 Drawing Sheets

(56) References Cited

FOREIGN PATENT DOCUMENTS

| JP | 2008-211943 | | 9/2008 |
|---|---|---|---|
| JP | 2008-211943 A | | 9/2008 |
| JP | 2008211943 A | * | 9/2008 |
| JP | 2009-73363 A | | 4/2009 |
| JP | 2009-077557 | | 4/2009 |
| JP | 2009-077557 A | | 4/2009 |
| SU | 1620347 A1 | | 1/1991 |

OTHER PUBLICATIONS

A Written Opinion of the International Search Authority for International Application No. PCT/IB2010/001098, dated Jul. 5, 2010, mailed Jul. 13, 2010.
An International Preliminary Report on Patentability for International Application No. PCT/IB2010/001098 dated Oct. 5, 2011.
An English translation of the Japanese Office Action of corresponding Japanese Application No. JP 2010-005092, dated Jan. 10, 2012, mailed Jan. 17, 2012.
An English translation of the Chinese Notification of Opinion upon First Examination of corresponding Chinese Application No. 201080022185.6, issued on Jul. 3, 2013.
An English translation of the Japanese Notification of Reason for Rejection of corresponding Japanese Application No. 2009-166937, issued on May 28, 2013.
An English translation of the Korean Notice of Preliminary Rejection for the corresponding Korean Application No. 10-2011-7027685, issued on Apr. 12, 2013.
An English translation of the Chinese Office Action for the corresponding Chinese patent application No. 201080022185.6 issued on Dec. 4, 2013.

* cited by examiner

VEHICLE COMPONENT MOUNTING ARRANGEMENT

CROSS-REFERENCE TO RELATED APPLICATIONS

This application is a U.S. National stage of International Application No. PCT/IB2010/001098, filed May 12, 2010, which claims priority to Japanese Patent Application Nos. 2009-124249 filed May 22, 2009, 2009-166937 filed Jul. 15, 2009 and 2010-005092 filed Jan. 13, 2010. The entire disclosures of Japanese Patent Application Nos. 2009-124249, 2009-166937 and 2010-005092 are hereby incorporated herein by reference.

BACKGROUND

1. Field of the Invention

The present invention generally relates to a component mounting structure for an electric vehicle. More specifically, the present invention relates to a vehicle component mounting arrangement in which electrical components are arranged within an electric vehicle.

2. Background Information

Electric vehicles often include an electric motor, an inverter, a charger and other electrical components. These electrical components are sometimes arranged in a concentrated fashion in a frontward portion of the vehicle. One example of such an electric vehicle is disclosed in Japanese Laid-Open Patent Publication No. 6-303704.

SUMMARY

It has been discovered that when a large number of comparatively heavy electrical components (e.g., an electric motor, an inverter, and a charger) are concentrated in one portion of a vehicle, it is difficult balance the weight of the vehicle.

One object of the present invention is to provide an electrical component mounting structure for an electric vehicle that enables the weight of the vehicle to be balanced more easily.

In order to achieve the aforementioned object, a vehicle component mounting arrangement is provided that mainly comprises a vehicle body, a battery, a charger, a high-power electrical component other than the charger. The battery is mounted on the vehicle body. The charger is mounted on the vehicle body and converts a lower-voltage electric power supplied thereto from an external source into a higher-voltage electric power that is supplied to the battery. The high-power electrical component is mounted on the vehicle body with high voltage being supplied to the high-power electrical component. The charger and the high-power electrical component are arranged on longitudinally opposite sides of the battery with respect to a longitudinal direction of the vehicle body.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
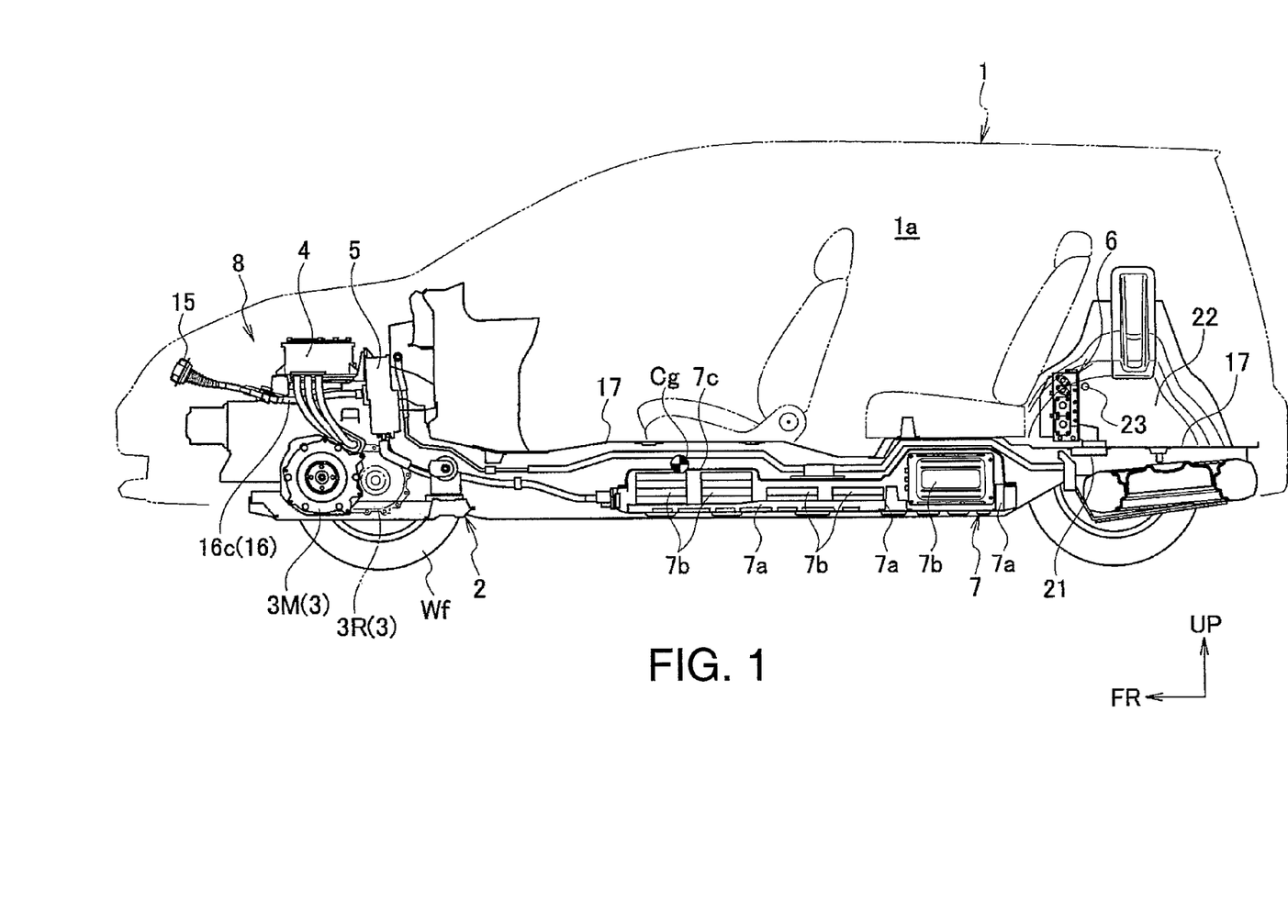
FIG. 1 is a schematic partial longitudinal cross sectional view of a component mounting structure for an electric vehicle according to an embodiment.
Figure 2:
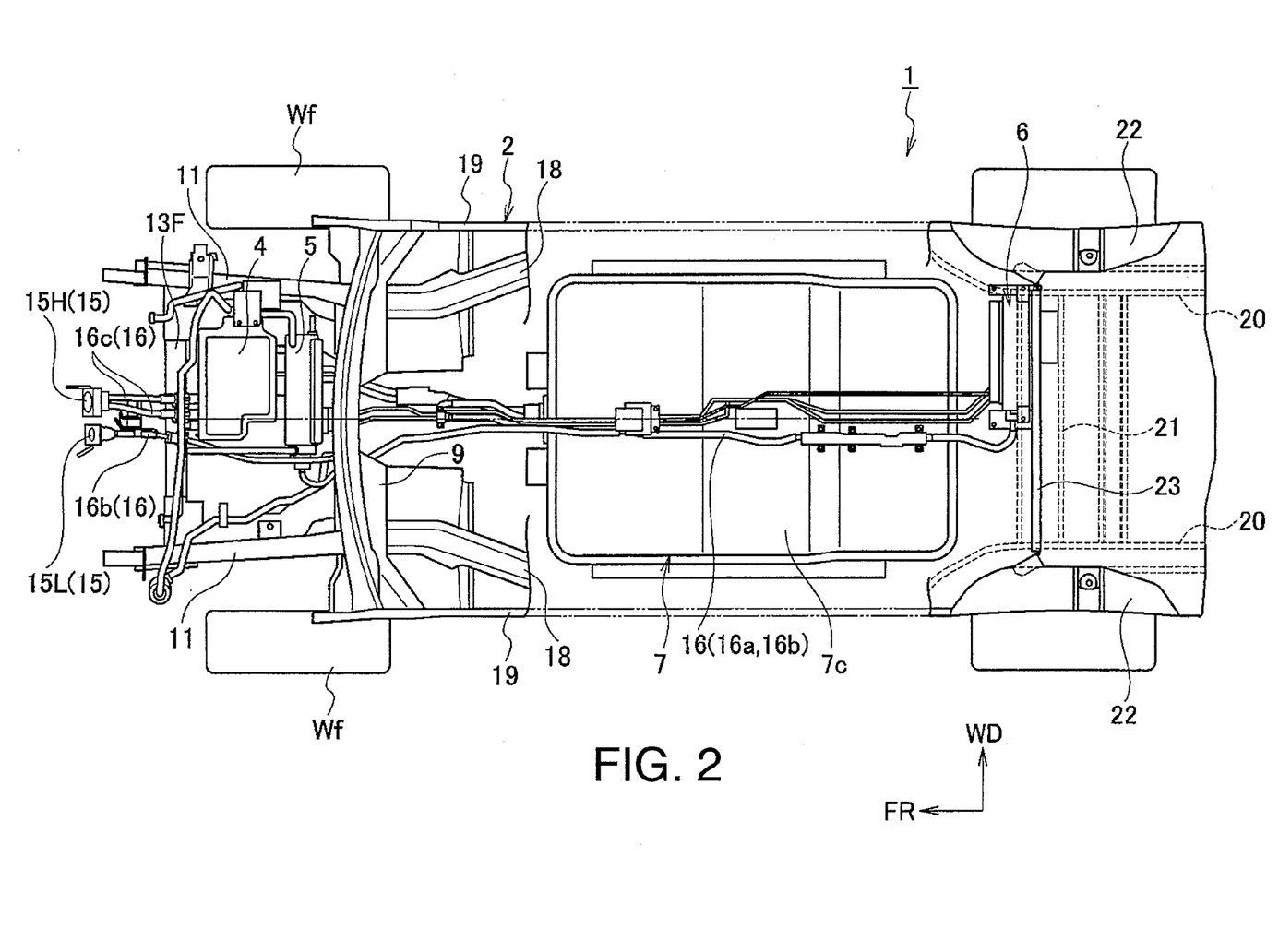
FIG. 2 is a schematic top plan view of the component mounting structure illustrated in FIG. 1.

Referring initially to FIGS. 1 and 2, a portion of an electric vehicle 1 is partially illustrated with an electric vehicle component mounting arrangement in accordance with a first embodiment. In the figures, an arrow FR indicates a frontward direction of the vehicle, an arrow UP indicates an upward direction of the vehicle, and an arrow WD indicates a widthwise direction of the vehicle.

Figure 5:
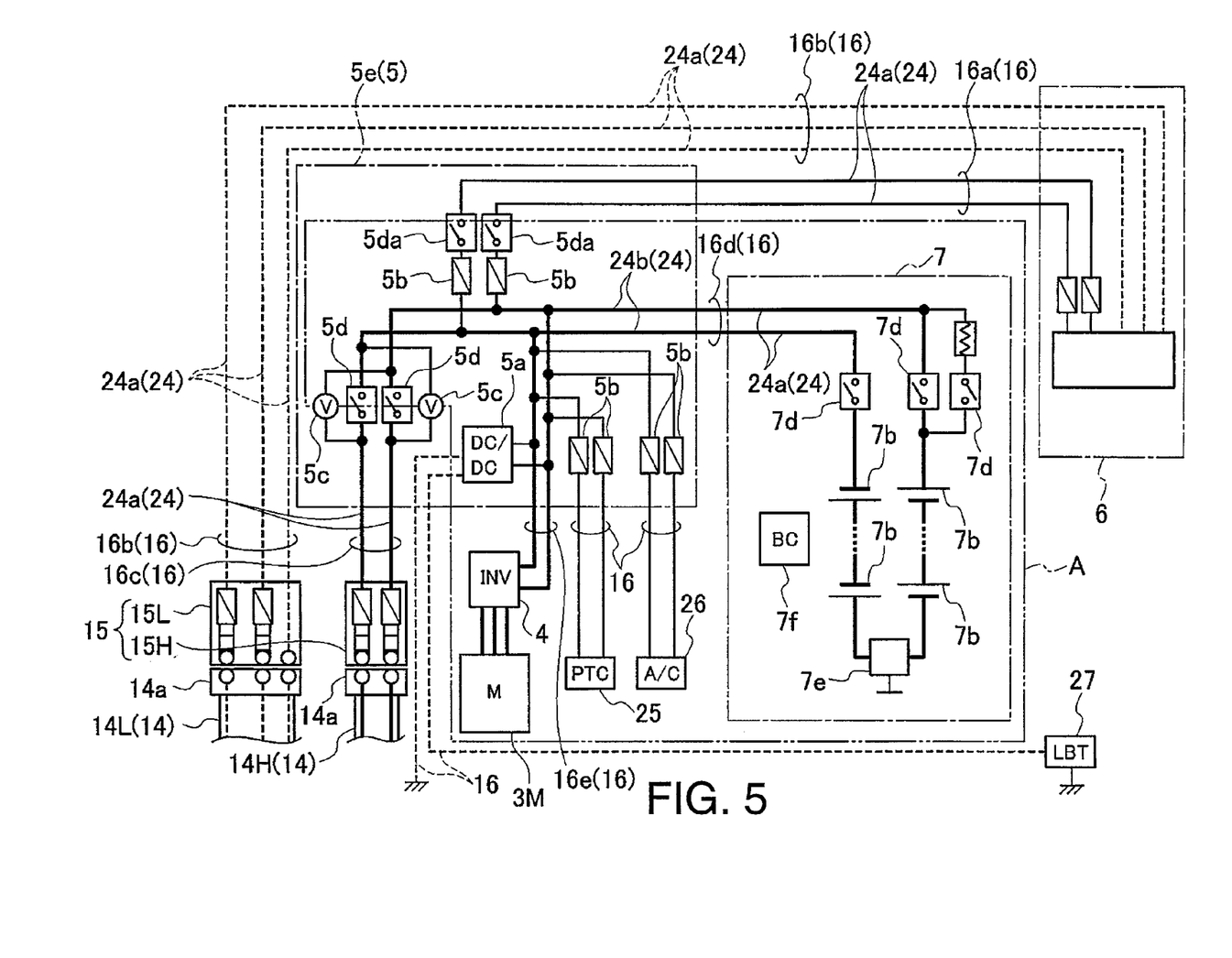
FIG. 5 is a schematic circuit diagram of the electrical components of the component mounting structure illustrated in FIGS. 1 to 4.

In this embodiment, the vehicle 1 includes a vehicle body 2 that supports a power unit 3 that includes an electric motor 3M and a reduction gear 3R. The electric motor 3M and the reduction gear 3R are configured as a single integrated unit. The electric motor 3M is installed in a front section of the vehicle body 2. The electric motor 3M is operatively coupled to a pair of front wheels Wf in a conventional manner to rotate the front wheels Wf. Thus, the electric motor 3M propels the vehicle 1. In addition to the electric motor 3M, various comparatively heavy electrical components are mounted on the vehicle body 2. In particular, as shown in FIGS. 1 and 2, the vehicle body 2 also supports various comparatively heavy electrical components including, but not limited to, an inverter 4, a circuit box 5, a charger 6 and a battery unit 7. Also as shown in FIG. 5, the vehicle body 2 further supports a PTC heater 25 and an electric powered compressor 26, which are also comparatively heavy electrical components that are mounted to the vehicle body 2. The PTC heater 25 and the electric powered compressor 26 are conventional electrical components that are used in an air conditioning system of the vehicle 1. As explained below, with the electric vehicle component mounting arrangement of this illustrated embodiment, the charger 6 and the other high-power electrical components are arranged in a dispersed fashion in a longitudinal direction of the vehicle 1, thereby making it easier to balance the weight of the vehicle 1.

In this embodiment, the electric motor 3M, the inverter 4, the circuit box 5, the PTC heater 25, and the electric powered compressor 26 are arranged in a frontward portion of the vehicle 1. Meanwhile, the battery unit 7 is arranged in a longitudinally middle portion of the vehicle 1 and the charger 6 is arranged in a rearward portion of the vehicle 1. In this way, a plurality of electrical components are arranged to be distributed appropriately in the longitudinal direction of the vehicle 1 such that the weight of the vehicle 1 can be more easily balanced with respect the longitudinal direction.

Figure 3:
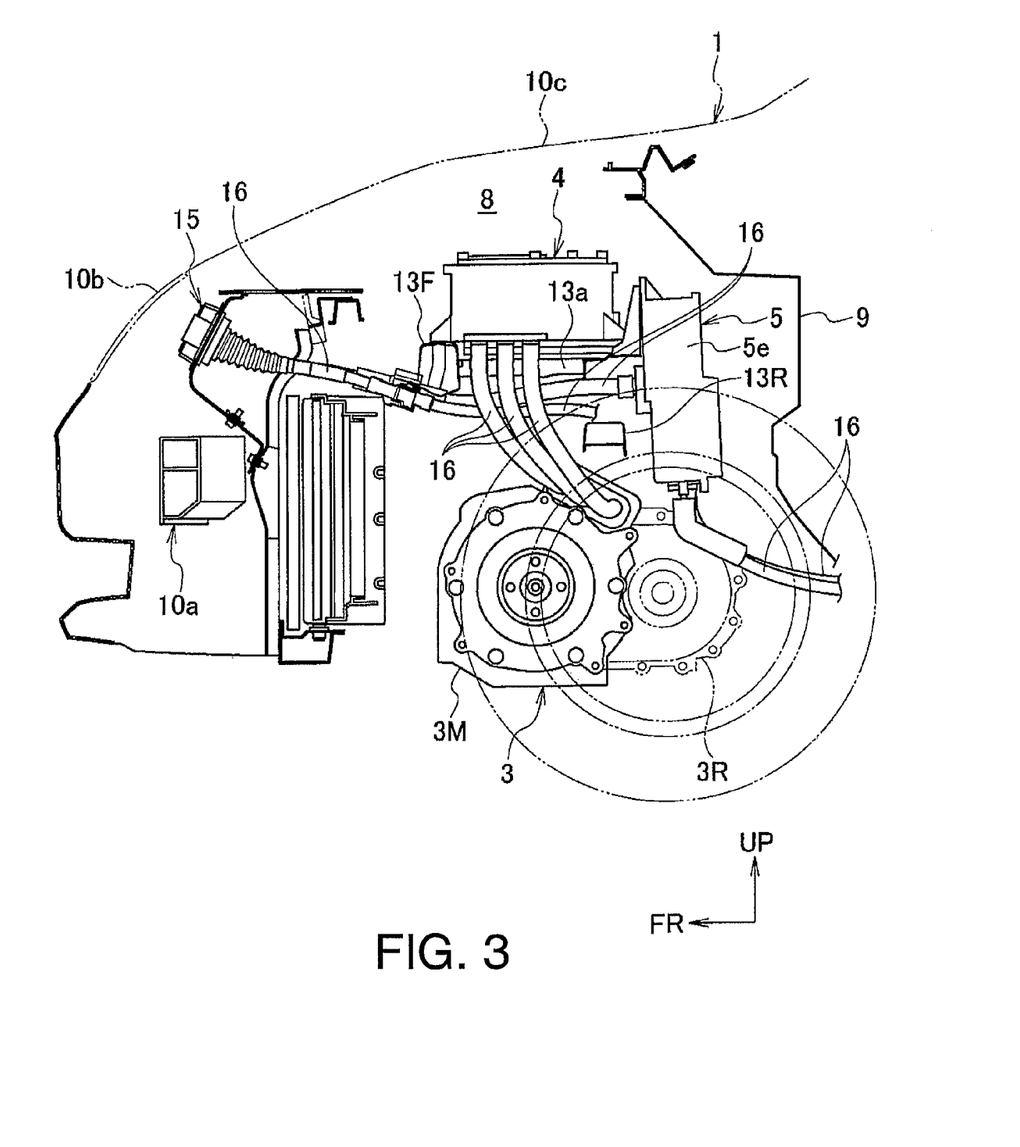
FIG. 3 is an enlarged partial longitudinal cross sectional view of a front portion of the component mounting structure illustrated in FIGS. 1 and 2.
Figure 4:
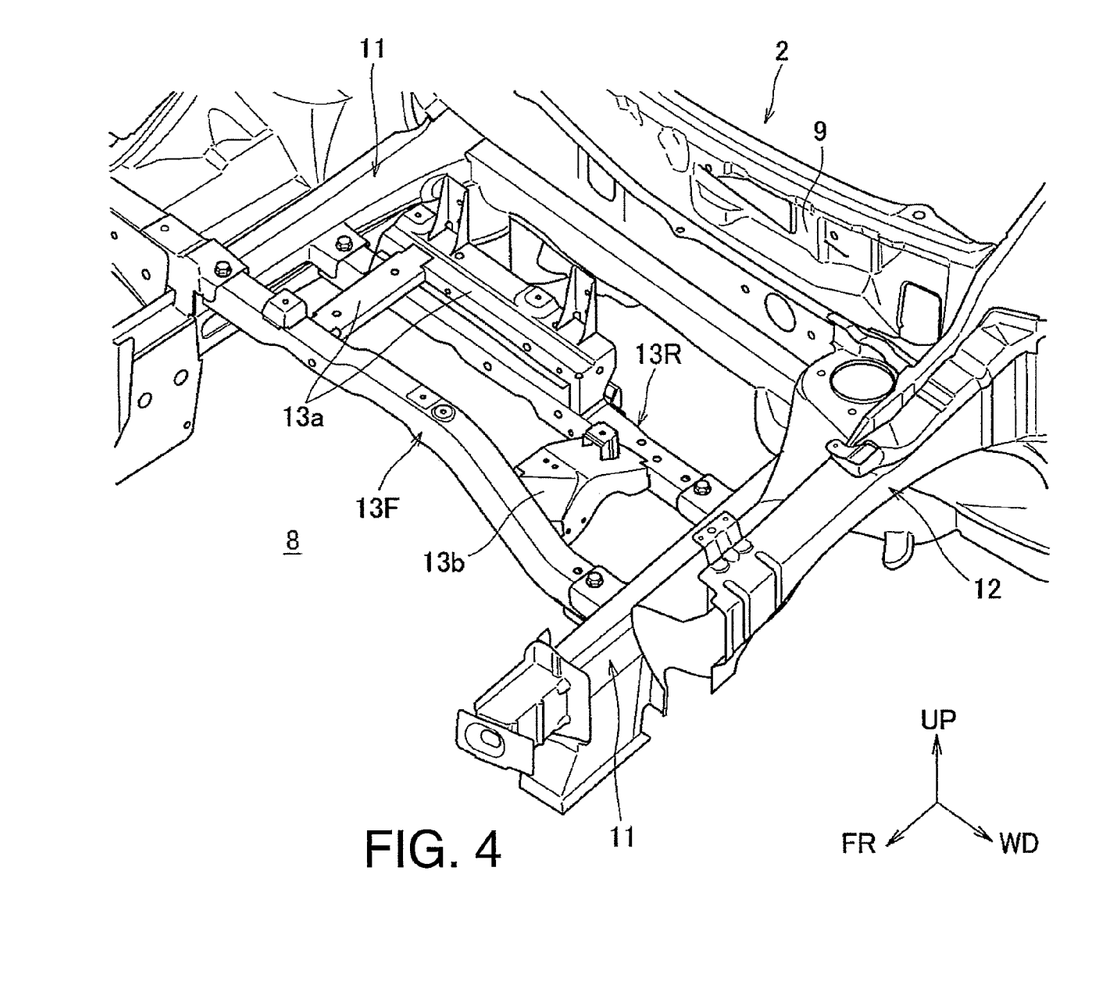
FIG. 4 is a perspective view of a front portion of the vehicle body of the component mounting structure illustrated in FIGS. 1 to 3.

As shown in FIGS. 3 and 4, a front compartment 8 is formed in a frontward portion of the vehicle 1. The front compartment 8 is a space surrounded by a dash panel 9 on a rearward side, a fender panel (not shown) on each of both widthwise sides, and a bumper 10a and grill 10b on a frontward side. A hood 10c is arranged and configured such that the hood 10c can open and close an upper opening of the front compartment 8. The power unit 3 (the electric motor 3M and the reduction gear 3R), the inverter 4, the circuit box 5, the PTC heater 25, and other components are housed inside the front compartment 8.

As shown in FIG. 4, the vehicle body 2 includes two front side members 11, which are arranged on widthwise sides of the front compartment 8 so as to extend in directions substantially parallel to the longitudinal direction of the vehicle 1. The vehicle body 2 also includes two hood ledge members 12 that are arranged above the front side members 11 on the widthwise sides of the front compartment 8 so as to extend in directions substantially parallel to the longitudinal direction of the vehicle 1. Cross members 13F and 13R are arranged between the left and right front side members 11 such that they are substantially aligned with the widthwise direction of the vehicle 1 and are spaced apart from each other in the longitudinal direction of the vehicle. Sub members 13a and 13b are attached to the two cross members 13F and 13R and serve to reinforce the cross members 13F and 13R. The sub members 13a and 13b also provide places for attaching such components as the inverter 4, the circuit box 5, the PTC heater 25 and the electric powered compressor 26. In this embodiment, each of the front side members 11, the hood ledge members 12, the cross members 13F and 13R and the sub members 13a and 13b constitutes a front vehicle frame member of the vehicle 1 (the vehicle body 2). The electrical components are attached to the vehicle body 2 using brackets and bolts, nuts, and other fasters as necessary.

In this embodiment, two charging ports 15 are provided on a frontward portion (front end portion in this embodiment) of the vehicle 1. The charging ports 15 serve as connectors for inserting a plug 14a (see FIG. 5) of an electric power supply cord 14 for supplying electric power from an external source. A moveable lid (not shown) is provided on at least a portion of the grill 10b for covering the charging ports 15 from the front. When charging is to be conducted, the charging ports 15 can be exposed in a frontward direction by opening the moveable lid. Each of the charging ports 15 is connected to an electric charging harness 16 such that electric power is transferred from the power supply cord 14 through the plug 14a, through the charging port 15, through the charging harness 16, and through the charger 6 before reaching the battery unit 7. In the illustrated embodiment, the battery unit 7 includes a rectangular or ladder-like frame 7a that supports a plurality of individual batteries 7b enclosed inside a cover 7c. However, the battery unit 7 can be a single battery, if needed and/or desired.

As shown in FIG. 5, the charging ports 15 include a low-voltage charging port 15L for conducting charging at a comparatively low (household) voltage (e.g., 100V or 200V) and a high-voltage charging port 15H for conducting charging at a comparatively high voltage (e.g., 500 V). The charging harnesses 16 are connected to the charging ports 15. Low-voltage electric power supplied to the low-voltage charging port 15L from a low-voltage power supply cord 14L is converted to a higher voltage by the charger 6 (which includes a transformer (not shown) for converting a low voltage to a higher voltage) and the higher voltage power is supplied to the batteries 7b inside the battery unit 7 through the circuit box 5 (conductor portions 24b inside the circuit box 5). High-voltage electric power supplied to the high-voltage charging port 15H from a high-voltage power supply cord 14H is supplied to the batteries 7b inside the battery unit 7 through the circuit box 5 (conductor portions 24b inside the circuit box 5). The high-voltage charging port 15H enables charging to be completed at a faster rate. In addition to the transformer, the charging 6 is also provided with additional electrical components such components as a rectifier circuit for converting alternating current to direct current and a filter.

As shown in FIG. 5, the harnesses 16 (16a, 16c, 16d, 16e, etc.) have conductor portions 24a that are electrically connected to conductor portions 24b enclosed inside a case 5e of the circuit box 5. The conductor portions 24b include a bus bar to which a high voltage is connected. The conductor portions 24a and 24b can each include a core wire, a terminal, and/or the like. Since the conductor portions 24b of the circuit box 5 serve as junction points (merge points) for the conductor portions 24b of the harnesses 16, the circuit box 5 can also be called a junction box. The high-voltage harnesses 16 are connected to the circuit box 5. The high-voltage harnesses 16 include a harness 16a (first high-voltage harness), a harness 16c (second high-voltage harness), a harness 16d (third high-voltage harness) and a harness 16e (fourth high-voltage harness). The harness 16a (first high-voltage harness) is routed toward the charger 6. The harness 16c (second high-voltage harness) is routed toward the high-voltage charging port 15H. The harness 16d (third high-voltage harness) is routed toward the battery unit 7. The harness 16e (fourth high-voltage harness) is routed toward the inverter 4. In this embodiment, such components as a DC/DC converter 5a, fuses 5b, voltage meters 5c, relays 5d and 5da are housed inside the case 5e. The DC/DC converter 5a serves to convert electric power to low-voltage power that is supplied to a battery (low-voltage battery) 27 (see FIG. 5).

As shown in FIG. 1 and as mentioned above, the batteries (high-voltage batteries) 7b of the battery unit 7 are mounted in the rectangular or ladder-like frame 7a, which is covered with the cover 7c. As shown in FIG. 5, the harnesses 16, the contactors 7d, a switch box 7e and a battery controller 7f are housed inside the battery unit 7. The battery unit 7 is detachably mounted to vehicle body frame members (the side members 18, the side sills 19, the cross members (not shown)) from underneath so as to be arranged under a floor panel 17 in a longitudinally middle portion of the vehicle 1.

As shown in FIGS. 1 and 2, the charger 6 is arranged above the floor panel 17 in a rearward portion of the vehicle 1 (farther rearward than a cabin 1a and the battery unit 7). In this embodiment, the charger 6 is fixed vehicle body frame members (the vehicle body 2) either directly or through a bracket. More specifically, the charger 6 is fixed to a cross member 21 arranged to span substantially in widthwise direction of the vehicle between rear side members 20 and a cross member 23 arranged to span substantially in the widthwise direction of the vehicle between rear wheel well housings 22.

FIG. 5 is a schematic circuit diagram for the vehicle 1 (electric vehicle) according to this embodiment. In FIG. 5, the conductor portions 24 to which high voltages are connected are indicated with solid lines, while the conductor portions 24 to which low voltages are connected are indicated with broken lines. The thicknesses of the lines are in accordance with the cross sectional surface area of the conductor portions 24. For example, the thicker the line is in FIG. 5, the larger the cross sectional area of the indicated conductor portion 24 is. In FIG. 5, the region enclosed with a double-dot chain line A is a region in which high voltages occur when the power unit 3 operates (i.e., when the vehicle 1 travels).

As shown in FIGS. 1 and 5, the vehicle 1 according this embodiment includes the following high-power electrical components to which a high voltage is supplied: the electric motor 3M, the inverter 4, the circuit box 5, the charger 6, the battery unit 7, the PTC heater 25, and the electric powered compressor 26. As shown in FIG. 1, among the high-power electrical components of this embodiment, the charger 6 is arranged in a rearward portion of the vehicle 1 (farther rearward than a longitudinal position of a center of gravity Cg of the vehicle 1), the battery unit 7 is arranged in a longitudinally middle portion of the vehicle 1, and the other high-power electrical components (i.e., the electric motor 3M, the inverter 4, the circuit box 5, the PTC heater 25, and the electric powered compressor 26) are arranged in a frontward portion of the vehicle 1 (farther frontward than the longitudinal position of the center of gravity Cg of the vehicle 1).

Since the charger 6 is arranged rearward of the vehicle center of gravity Cg and the other high-power electrical components (i.e., in this embodiment, the electric motor 3M, the inverter 4, the circuit box 5, the PTC heater 25, and the electric compressor 26) are arranged frontward of the vehicle center of gravity Cg, it is easier to achieve a good balance of weight between the front and rear of the vehicle 1 than if the charger 6 and other high-power electrical components are concentrated in positions frontward of or rearward of the vehicle center of gravity Cg.

Also, since the charger 6 and the other high-power electrical components (i.e., in this embodiment, the electric motor 3M, the inverter 4, the circuit box 5, the PTC heater 25, and the electric compressor 26) are arranged such that the battery unit 7 is longitudinally between the charger 6 and the other high-power electrical components, it is easier to achieve a good balance of weight between the front and rear of the vehicle 1 than if the charger 6 and other high-power electrical components are concentrated in positions frontward of or rearward of the battery unit 7. Moreover, since the battery unit 7 is comparatively heavy, it is easier to achieve a good balance of weight between the front and rear of the vehicle 1 with the battery unit 7 arranged in a longitudinally middle position as in this embodiment than if the battery unit 7 were arranged in a frontward portion or a rearward portion of the vehicle 1.

When charging is conducted with a low-voltage power supply cord 14L connected to the low-voltage charging port 15L, a comparatively small current flows in the charger 6 and in the charging harness 16a (first high-voltage harness) and the charging harness 16b (low-voltage harness) connected to the charger 6. Therefore, the harnesses 16a and 16b are configured such that the cross sectional areas of the conductor portions 24 thereof are smaller than the cross sectional areas of the conductor portions 24 of the charging harness 16c (second high-voltage harness) connected to the high-voltage charging port 15H and the charging harness 16d (third high-voltage harness) connected to the battery unit 7. In other words, the harnesses 16a and 16b can be thinner than the harnesses 16c and 16d.

As shown in FIGS. 1 and 2, in this embodiment, the charging harness 16b is connected between the low-voltage charging port 15L (charging port 15) and the charger 6. Thus, the charging harness 16b is comparatively long because the low-voltage charging port 15L is arranged on a frontward portion of the vehicle 1 and the charger 6 is arranged in a rearward portion of the vehicle 1. Additionally, in this embodiment, one end of the charging harness 16a is connected to the circuit box 5 inside the front compartment 8 such that high-voltage electric power produced at the charger 6 is transferred through the charging harness 16a, the circuit box 5 and the charging harness 16d (connected between the circuit box 5 and the battery unit 7) and then supplied to the battery unit 7. Consequently, the charging harness 16a is also comparatively long because the charging harness 16a spans between a frontward portion and a rearward portion of the vehicle 1.

Thus, the weight of the charging harness 16a is larger than it would be if the charger 6 and the circuit box 5 were closer together. Likewise, the weight of the charging harness 16b is larger than it would be if the charger 6 and the charging port 15 were closer together. However, since the harnesses 16a and 16b can be made narrower than the other harnesses 16 (i.e., the harnesses 16c and 16d and the charging harness 16e are connected to the inverter 4) as explained above, the weights of the harnesses 16a and 16b can be made smaller than they would be if thicker harnesses were used. Thus, the weight of the vehicle 1 as a whole can also be suppressed. Also, the use of thinner harnesses 16a and 16b enables the work of installing the harnesses 16a and 16b easier.

It is possible to make the charging harness 16a (first high-voltage harness) connected to the charger 6 even shorter by bypassing the circuit box 5 and connecting the charging harness 16a directly to the battery unit 7. However, such an arrangement would result in two conductive paths between the high-power electrical components fixed to the vehicle body 2 and the battery unit 7, which is detachably mounted to the vehicle body 2. Consequently, aligning the positions of connecting portions would be more difficult than with a single conductive path. In this embodiment, electric power from the charger 6 is transferred through the charging harness 16a to the circuit box 5 and then through the charging harness 16d to the battery unit 7. In this way, there is only one conductive path between the high-power electrical components fixed to the vehicle body 2 (i.e., the circuit box 5 in this embodiment) and the battery unit 7 (which is detachably mounted to the vehicle body 2). As a result, the structure of the connecting portions of the conductive path can be simplified and aligning the positions of the connecting portions can be accomplished more easily.

As shown in FIGS. 1 and 2, the circuit box 5 is arranged closer to the charging ports 15 than to the charger 6. Consequently, the charging harness 16c (second high-voltage harness, see FIG. 5) connecting the high-voltage charging port 15H to the circuit box 5 is shorter. Thus, the electric power loss incurred when high-voltage power is supplied from the high-voltage charging port 15H through the charging harness 16c and the circuit box 5 can be suppressed more readily. As explained previously, since the current is comparatively small when electric power is transferred from the low-voltage charging port 15L through the charging harness 16b, the charger 6, the charging harness 16a and the circuit box 5, the electric power loss incurred is not very large even though the charging port 15 and the charger 6 are arranged far apart from each other. Conversely, since the current is comparatively large when high-voltage electric power is transferred from the high-voltage charging port 15H through the charging harness 16c and the circuit box 5, it is preferable to reduce an electrical resistance of the current path in order to reduce the electric power loss incurred during high-voltage charging. Therefore, it is preferable to shorten the charging harness 16c in order to reduce its electrical resistance. By making the charging harness 16c shorter, the total weight of the charging harness 16c can be suppressed even if the conductor portion 24 of the charging harness 16c is made thicker in order to further reduce the electrical resistance. As a result, the weight of the vehicle 1 can be suppressed and the task of installing the charging harness 16c can be accomplished more easily. Also, since the circuit box 5 and the charger 6 can be arranged spaced apart from each other, the weight of the vehicle 1 can be balanced more easily than if the circuit box 5 and the charger 6 are arranged close together.

As shown in FIGS. 1 and 2, the battery unit 7 is arranged closer to the circuit box 5 than to the charger 6. Consequently, the charging harness 16d (third high-voltage harness, see FIG. 5) connecting the circuit box 5 to the battery unit 7 is shorter and the electric power loss incurred when high-voltage power is supplied from the circuit box 5 to the battery unit 7 through the charging harness 16d can be suppressed more readily. Since the current that results when high-voltage power is supplied from the circuit box 5 to the battery unit 7 through the charging harness 16d is comparatively large, it is preferable to reduce an electrical resistance in order to reduce the electric power loss incurred during high-voltage charging. Therefore, it is preferable to shorten the charging harness 16d in order to reduce the electrical resistance. By making the charging harness 16d shorter, the total weight of the charging harness 16d can be suppressed even if the conductor portion 24 of the charging harness 16d is made thicker in order to further reduce the electrical resistance. As a result, the weight of the vehicle 1 can be suppressed and the task of installing the charging harness 16d can be accomplished more easily. Also, since the battery unit 7 and the charger 6 can be arranged spaced apart from each other, the weight of the vehicle 1 can be balanced more easily than if the battery unit 7 and the charger 6 are arranged close together.

Additionally, in this embodiment, the battery unit 7 is arranged between the charger 6 and the circuit box 5. Consequently, the battery unit 7, the charger 6, and the circuit box 5 are arranged in a dispersed fashion and it is even easier to balance the weight of the vehicle 1. As shown in FIGS. 1 and 2, with this embodiment it is easier to balance the distribution of weight in the longitudinal direction of the vehicle because the battery unit 7, the charger 6, and the circuit box 5 are arranged to be dispersed in the longitudinal direction.

When the power unit 3 is operated (when the vehicle 1 is driven), high-voltage DC electric power is supplied from the battery unit 7 to the inverter 4 through the charging harness 16d (third high-voltage harness), the circuit box 5 and the charging harness 16e (see FIG. 5), and high-voltage AC electric power produced by the inverter 4 is supplied to the electric motor 3M. In this embodiment, since the circuit box 5 and the inverter 4 are both arranged inside the front compartment 8, the charging harness 16e can be comparatively short and the electric power loss incurred when the power unit 3 is operated can be suppressed. Furthermore, in this embodiment, the charging harness 16e can be made particularly short because the circuit box 5 and the inverter 4 are arranged closely adjacent to each other.

In this embodiment, the charging ports 15 are arranged on a frontward portion of the vehicle 1, the circuit box 5 is arranged inside the front compartment 8, and the battery unit 7 and the charger 6 are arranged rearward of the circuit box 5. As a result, the arrangement of the circuit box 5 in the vehicle 1 can be accomplished more easily, the charging harness 16c between the circuit box 5 and the high-voltage charging port 15H can be made shorter, and the electric power loss incurred when charging is conducted with high-voltage electric power can be suppressed more readily. Also, since the charging ports 15 are arranged in a frontward portion of the vehicle 1, it is easier to visually recognize when the power supply cord 14 is connected to one of the charging ports 15 and a driver is less likely to move the vehicle 1 while the power supply cord 14 is still connected. Having the battery unit 7 and the charger 6 arranged rearward of the circuit box 5 also makes it easier to balance the weight of the vehicle 1 in the longitudinal direction of the vehicle.

As shown in FIG. 5, the relays 5da are provided at the ends of the charging harness 16a that connects to the circuit box 5. In this embodiment, the relays 5da are arranged inside the case 5e (see FIGS. 3 and 5) of the circuit box 5 and inside the front compartment 8. The close (connect) during charging and open when charging is not being conducted. In this way, a high voltage is applied to the charging harness 16a during charging but not when charging is not being conducted, such as when the vehicle is moving. Even if the charging harness 16a (which is comparatively long in the longitudinal direction of the vehicle) is damaged during a collision occurring when the vehicle 1 is being driven, a short circuit is prevented from occurring at the charging harness 16a. Also current leakage from the damaged portion of the charging harness 16a to the vehicle body 2 is prevented because the charging harness 16a is isolated from the portions where current is flowing by the relays 5da. As a result, the safety of the vehicle is improved.

The component layout described above in which the charger 6 is separated from the other high-power electrical components in the longitudinal direction of the vehicle can be said to be a preferred layout because it enables the weight of the vehicle 1 to be balanced in the longitudinal direction and the safety of the vehicle 1 during driving to be improved. It is also preferred to using a control unit (not shown) to electrically control the operation of the relays 5da. In such a case, the relays 5d can be controlled to operate when a sensor indicates that a low-voltage power supply cord 14L is connected to the low-voltage charging port 15L.

In this embodiment, among the high-power electrical components, the charger 6 and the battery unit 7 are arranged outside the front compartment 8. Thus, the component layout used in this embodiment is advantageous when the vehicle 1 is small such as with a sports car in which the hood 10c is low, or when the vehicle is otherwise configured such that it is difficult to secure a large space for the front compartment 8. Improving the weight balance of the vehicle 1 offers the added advantage of enabling the drivability of the vehicle 1 to be improved. When facilities (infrastructure) offering a supply of high-voltage electric power become more readily available and it becomes unnecessary to conduct charging using a low-voltage power supply, it will be possible to eliminate the charger 6 from the vehicle 1 and further reduce the weight of the vehicle 1. With this embodiment, there is the additional advantage that the charger can be removed comparatively easily because the charger 6 is arranged in a position separated from the other high-power electrical components. Also, from the standpoint of manufacturing the vehicle 1, the presence or absence of the charger 6 has little affect on the layout of the other components (particular the component layout inside the front compartment 8) and the specifications of the vehicle 1 can be easily adapted for including or not including a charger 6. Thus, this embodiment also offers the advantage of helping to reduce manufacturing costs.

With this embodiment, since the high-power electrical components other than the charger 6 and the battery unit 7 are arranged inside the front compartment 8 and the charging ports 15 are arranged on a front portion of the vehicle 1, the lengths of the high-voltage harnesses 16 (e.g., 16c, 16d, 16e, etc.) other than the charging harness 16a connected to the charger 6 can be shortened. As a result, the electric power loss incurred during high-voltage charging and when the power unit 3 is operated can be suppressed and a weight increase resulting from using comparatively thick harnesses 16c, 16d and 16e can be suppressed. Additionally, the time and effort required to arrange the harnesses 16c, 16d and 16e in the vehicle 1 can be reduced.

As explained above, in this embodiment, the circuit box 5 is arranged closer to the charging ports 15 (connector section) than to the charger 6. As a result, the charging harness 16c (second high-voltage harness) connecting the high-voltage charging port 15H and the circuit box 5 can be made shorter and the electric power loss incurred when high-voltage electric power is supplied through the charging harness 16c can be suppressed more easily.

In this embodiment, the battery unit 7 is arranged closer to the circuit box 5 than to the charger 6. As a result, the charging harness 16*d* (third high-voltage harness) connecting the circuit box 5 and the battery unit 7 can be made shorter and the electric power loss incurred when high-voltage electric power is supplied through the charging harness 16*d* can be suppressed more easily.

In this embodiment, the battery unit 7 is arranged between the charger 6 and the circuit box 5. Consequently, the battery unit 7, the charger 6 and the circuit box 5 are arranged in a dispersed fashion and it is easier to balance the weight of the vehicle 1.

In this embodiment, the charging ports 15 are arranged on a frontward portion of the vehicle 1, the circuit box 5 is arranged inside the front compartment 8, and the battery unit 7 and the charger 6 are arranged rearward of the circuit box 5. As a result, the arrangement of the circuit box 5 in the vehicle 1 can be accomplished more easily, the charging harness 16*c* between the circuit box 5 and the high-voltage charging port 15H can be made shorter, and the electric power loss incurred when charging is conducted with high-voltage electric power can be suppressed more readily. Also, having the battery unit 7 and the charger 6 arranged rearward of the circuit box 5 makes it easier to balance the weight of the vehicle 1 in the longitudinal direction of the vehicle.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "frontward", "rearward", "above", "downward", "vertical", "horizontal", "below" and "transverse" as well as any other similar directional terms refer to those directions of an electric vehicle having the electric vehicle structure. Accordingly, these terms, as utilized to describe the electric vehicle structure should be interpreted relative to an electric vehicle having the electric vehicle structure.

While only selected embodiments have been chosen to illustrate the present invention, it will be apparent to those skilled in the art from this disclosure that various changes and modifications can be made herein without departing from the scope of the invention as defined in the appended claims. For example, the electric vehicle component mounting arrangement can also be applied to a rear-wheel drive vehicle. It is also acceptable for a charger to be arranged in a frontward portion of the vehicle, the high-power electrical components other than the charger to be arranged in a rearward portion of the vehicle, and the charging ports to be arranged on a rearward portion of the vehicle. Also, it is not mandatory for the charging ports to be provided on a frontward end or a rearward end of the vehicle. It is also acceptable to provide the charging ports on a side surface of a frontward portion or rearward portion of the vehicle. Furthermore, neither the positions where the charger, the battery unit, and the high-power electrical components other than the charger are attached to the vehicle body nor the constituent features of these components are limited to those described in the embodiment. Thus, the foregoing descriptions of the embodiments according to the present invention are provided for illustration only, and not for the purpose of limiting the invention as defined by the appended claims and their equivalents.

What is claimed is:

1. A vehicle component mounting structure comprising:
   a vehicle body;
   a battery mounted on the vehicle body;
   a charger mounted on the vehicle body that converts a lower-voltage electric power supplied thereto from an external source into a higher-voltage electric power that is supplied to the battery;
   a high-power electrical component other than the charger mounted on the vehicle body with high voltage being supplied to the high-power electrical component;
   an electric charging port electrically connected to the charger to supply electric power from the external source to the charger, the electric charging port being positioned closer to the high-power electrical component than to the charger, and the charger and the high-power electrical component being arranged on opposite sides of the battery with respect to a longitudinal direction of the vehicle body;
   a first charging harness electrically connecting the battery to the high-power electrical component;
   a second charging harness electrically connecting the first charging harness to the charger; and
   a relay operatively arranged with respect to the second charging harness with the relay being arranged to switch the second harness between a state of being connected to the first charging harness and a state of being disconnected from the first charging harness.

2. The vehicle component mounting structure as recited in claim 1, wherein
   the high-power electrical component is arranged farther frontward than the charger with respect to the longitudinal direction of the vehicle body, and the charging port is arranged on a frontward portion of the vehicle body.

3. The vehicle component mounting structure as recited in claim 1, wherein
   the electric charging port includes a low-voltage charging port electrically connected to the charger by a low-voltage harness and a high-voltage charging port electrically connected to the high-power electrical component.

4. The vehicle component mounting structure as recited in claim 3, wherein
   the high-power electrical component includes a circuit box that is arranged closer to the electric charging port than to the charger.

5. The vehicle component mounting structure as recited in claim 4, wherein
   the battery is arranged closer to the circuit box than to the charger.

6. The vehicle component mounting structure as recited in claim 5, wherein
   the battery is arranged between the circuit box and the charger.

7. The vehicle component mounting structure as recited in claim 5, wherein
   the electric charging port is arranged on a frontward portion of the vehicle body, with the circuit box being disposed inside a front compartment formed in a frontward portion of the vehicle body, and the battery and the charger being arranged rearward of the circuit box.

8. The vehicle component mounting structure as recited in claim 4, wherein
   the battery is arranged between the circuit box and the charger.

9. The vehicle component mounting structure as recited in claim 8, wherein
the electric charging port is arranged on a frontward portion of the vehicle body, with the circuit box being disposed inside a front compartment formed in a frontward portion of the vehicle body, and the battery and the charger being arranged rearward of the circuit box.

10. The vehicle component mounting structure as recited in claim 4, wherein
the electric charging port is arranged on a frontward portion of the vehicle body, with the circuit box being disposed inside a front compartment formed in a frontward portion of the vehicle body, and the battery and the charger being arranged rearward of the circuit box.

11. The vehicle component mounting structure as recited in claim 1, wherein
the battery including a plurality of individual batteries arranged as a single unit.

12. The vehicle component mounting structure as recited in claim 1, wherein the charger and the high-power electrical component are arranged on longitudinally opposite sides of the battery with respect to the longitudinal direction of the vehicle body.

13. A vehicle component mounting structure comprising:
a vehicle body;
a battery mounted on the vehicle body;
a charger mounted on the vehicle body that converts a lower-voltage electric power supplied thereto from an external source into a higher-voltage electric power that is supplied to the battery;
a high-power electrical component other than the charger mounted on the vehicle body with high voltage being supplied to the high-power electrical component, the charger and the high-power electrical component being arranged on opposite sides of the battery with respect to a longitudinal direction of the vehicle body; and
an electric charging port electrically connected to the charger to supply electric power from the external source to the charger, the electric charging port being positioned closer to the high-power electrical component than to the charger, the electric charging port including a low-voltage charging port electrically connected to the charger by a low-voltage harness and a high-voltage charging port electrically connected to the high-power electrical component, and the high-power electrical component including a circuit box that is arranged closer to the electric charging port than to the charger, the circuit box being electrically connected to the charger by a first high-voltage harness, electrically connected to the high-voltage charging port by a second high-voltage harness, and electrically connected to the battery by a third high-voltage harness.

14. The vehicle component mounting structure as recited in claim 13, wherein
the battery is arranged closer to the circuit box than to the charger.

15. The vehicle component mounting structure as recited in claim 13, wherein
the battery is arranged between the circuit box and the charger.

16. The vehicle component mounting structure as recited in claim 13, wherein
the electric charging port is arranged on a frontward portion of the vehicle body, with the circuit box being disposed inside a front compartment formed in a frontward portion of the vehicle body, and the battery and the charger being arranged rearward of the circuit box.

17. The vehicle component mounting structure as recited in claim 13, wherein
the charger and the high-power electrical component are arranged on longitudinally opposite sides of the battery with respect to the longitudinal direction of the vehicle body.

* * * * *